(12) United States Patent
Wagner et al.

(10) Patent No.: US 8,707,166 B2
(45) Date of Patent: Apr. 22, 2014

(54) PLAIN TEXT FORMATTING OF DATA ITEM TABLES

(75) Inventors: Dirk Wagner, Schiffweiler (DE); Frank Wittig, Spiesen Elversberg (DE)

(73) Assignee: SAP AG, Walldorf (DE)

( * ) Notice: Subject to any disclaimer, the term of this patent is extended or adjusted under 35 U.S.C. 154(b) by 764 days.

(21) Appl. No.: 12/040,678

(22) Filed: Feb. 29, 2008

(65) Prior Publication Data

US 2009/0222718 A1 Sep. 3, 2009

(51) Int. Cl.
*G06F 17/21* (2006.01)

(52) U.S. Cl.
USPC ............ 715/244; 715/204; 715/207; 715/838

(58) Field of Classification Search
USPC ........... 715/204, 513, 207, 838, 227; 717/144
See application file for complete search history.

(56) References Cited

U.S. PATENT DOCUMENTS

| | | | | |
|---|---|---|---|---|
| 5,911,776 | A * | 6/1999 | Guck | 709/217 |
| 6,336,124 | B1 * | 1/2002 | Alam et al. | 715/205 |
| 6,701,315 | B1 * | 3/2004 | Austin | 1/1 |
| 7,168,035 | B1 * | 1/2007 | Bell et al. | 715/234 |
| 7,930,631 | B2 * | 4/2011 | Sahota et al. | 715/239 |
| 2001/0018697 | A1 * | 8/2001 | Kunitake et al. | 707/517 |
| 2004/0205638 | A1 * | 10/2004 | Thomas et al. | 715/526 |

OTHER PUBLICATIONS

Chen, H-H., et al., "Mining Tables from Large Scale HTML Texts", Proceedings of the International Conference on Computational Linguistics, vol. 1, Jan. 1, 2000, pp. 166-172.
Akinori, I., "History of w3m", W3M Website, Nov. 6, 1999, 3 pages.
"Tables in HTML documents", W3C Website, Feb. 1, 2008, 28 pages.
Podmaster, "Convert HTML Table to Text", PerlMonks, Mar. 21, 2004, 4 pages.
European Search Report for EP Patent Application No. 09002881.2, mailed on Jul. 7, 2009, 8 pages.
"HTML to Text", SREHTTP.org Website, Feb. 7, 2008, 4 pages.

* cited by examiner

*Primary Examiner* — Doug Hutton, Jr.
*Assistant Examiner* — Brian Garmon
(74) *Attorney, Agent, or Firm* — Brake Hughes Bellermann LLP

(57) ABSTRACT

Methods and systems are described for plain text formatting of data item tables. An example system includes a plain text table manager including a template manager configured to obtain a hierarchical template including table information associated with a table, table information formatted in accordance with a non-proprietary markup language format. The example system also includes a parsing engine configured to parse the table information associated with the table to determine one or more markup language elements associated with the table. The example system also includes a plain text layout engine configured to determine a plain text graphical table structured layout associated with the table, based on the one or more markup language elements. The example system also includes a graphical table structure generator configured to generate a plain text graphical table structured view of the table indicating one or more data items indicated by the table information.

32 Claims, 8 Drawing Sheets

500

```
402  ELEMENT   :    table
404  ATTRIBUTE :    align = center
406  ATTRIBUTE :    style = background-color:#FF0000;
408  ATTRIBUTE :    summary =
410  ELEMENT   :      thead
412  ELEMENT   :        tr
414  ATTRIBUTE :        style = text-align:center;background-color:#808080;font-family:serif;font-size:16pt
416  ELEMENT   :          th
418  TEXT      :            Product ID
420  ELEMENT   :          th
422  TEXT      :            Description
424  ELEMENT   :      tbody
426  ELEMENT   :        tr
428  ATTRIBUTE :        style = text-align:left;background-color:#FFFF00;font-family:fantasy;font-size:08pt
430  ELEMENT   :          td
432  TEXT      :            DIRKS_PRODUCT
434  ELEMENT   :          td
436  TEXT      :            Product of Dirk
     ELEMENT   :    br
     ELEMENT   :    br
```

300

```
<?xml version="1.0"?><html xmlns=http://www.w3.org/1999/xhtml>#<head>#<meta http-equiv="content-type" content="text/html ; charset=utf-8"/>##<head>#<body>#<p>text</p>#<p><table align="center" style="background-color:#FF0000;" summary=" "><thead><tr style="text-align:center ; background-color:#808000; font-family:serif; font-size:16pt"><th>Product ID</th><th>Description</th></tr></thead><tbody><tr style="text-align:left; background-color:#FFFF00; font-family:fantasy ; font-size:08pt"><td>DIRKS_PRODUCT</td><td>Product of Dirk</td></tr></tbody></table></p>#</body>#</html>
```

FIG. 3

```
<?xml version="1.0" ?>
- <html xmlns="http://www.w3.org/1999/xhtml">
  - <head>
      <meta http-equiv="content-type" content="text/html; charset=utf-8" />
    </head>
  - <body>
      <p>text</p>
    - <p>
      - <table align="center" style="background-color:#FF0000;"summary=" ">
        - <thead>
          - <tr style="text-align:center;background-color:#808080;font-family:serif;font-size:16pt">
              <th>Product ID</th>
              <th>Description</th>
            </tr>
          </thead>
        - <tbody>
          - <tr style="text-align:left;background-color:#FFFF00;font-family:fantasy;font-size:08pt">
              <td>DIRKS_PRODUCT</td>
              <td>Product of Dirk</td>
            </tr>
          </tbody>
        </table>
      </p>
    </body>
  </html>
```

| | | |
|---|---|---|
| 402 — ELEMENT : | table | |
| 404 — ATTRIBUTE : | align = center | |
| 406 — ATTRIBUTE : | style = background-color:#FF0000; | |
| 408 — ATTRIBUTE : | summary = | |
| 410 — ELEMENT : | thead | |
| 412 — ELEMENT : | tr | |
| 414 — ATTRIBUTE : | style = text-align:center;background-color:#808080;font-family:serif;font-size:16pt | |
| 416 — ELEMENT : | th | |
| 418 — TEXT : | Product ID | |
| 420 — ELEMENT : | th | |
| 422 — TEXT : | Description | |
| 424 — ELEMENT : | tbody | |
| 426 — ELEMENT : | tr | |
| 428 — ATTRIBUTE : | style = text-align:left;background-color:#FFFF00;font-family:fantasy;font-size:08pt | |
| 430 — ELEMENT : | td | |
| 432 — TEXT : | DIRKS_PRODUCT | |
| 434 — ELEMENT : | td | |
| 436 — TEXT : | Product of Dirk | |
| — ELEMENT : | br | |
| — ELEMENT : | br | |

PLAIN TEXT FORMATTING OF DATA ITEM TABLES

TECHNICAL FIELD

This description relates to techniques for plain text formatting of data item tables.

BACKGROUND

Relationships among entities such as businesses and customers may be developed or improved by personalizing communications among target recipients of messages or other communication items shared among the entities. For example, many businesses recognize that personalized customer service may encourage customers to continue and expand a business relationship over time, thus driving new growth and helping the business to achieve or maintain competitive agility.

As an example, customer relationship management (CRM) may involve acquiring and retaining customers or other types of business partners, improving loyalty and gaining insight among such business partners, and implementing strategies focused on such customers or business partners.

Developing personalized communications may involve obtaining information regarding target recipients of messages. For example, a business may obtain personal information regarding customers or potential customers such as their name, contact information, purchase history and/or personal preferences. Further, the business may obtain information associated with data items such as products that the customers or potential customers may find interesting. The business may then develop marketing campaigns or newsletters that may be personalized for each individual target recipient based on the obtained information. Such information may more conveniently be presented to a reader via a table such as a product table. However, some target recipients may prefer to receive communication items via a plain text-based communication medium such as fax or plain text email messages, and thus table formatting provided by markup language representations of tables may not provide feasible representations for viewing.

Thus, it may be desirable to provide techniques for generating data item tables in plain text table structured views.

SUMMARY

According to one general aspect, a system includes a plain text table manager including a template manager configured to obtain a hierarchical template including table information associated with a table, the table information formatted in accordance with a non-proprietary markup language format, a parsing engine configured to parse the table information associated with the table to determine one or more markup language elements associated with the table, a plain text layout engine configured to determine a plain text graphical table structured layout associated with the table, based on the one or more markup language elements, and a graphical table structure generator configured to generate a plain text graphical table structured view of the table indicating one or more data items indicated by the table information.

According to another aspect, a method includes obtaining a hierarchical template including table information associated with a table, the table information formatted in accordance with a non-proprietary markup language format. The method further includes parsing the table information associated with the table to determine one or more markup language elements associated with the table. The method further includes determining a plain text graphical table structured layout associated with the table, based on the one or more markup language elements, and generating a plain text graphical table structured view of the table indicating one or more data items indicated by the table information.

According to yet another aspect, a computer program product may be tangibly embodied on a computer-readable medium, and may be configured to cause a data processing apparatus to obtain a hierarchical template including table information associated with a table, the table information formatted in accordance with a non-proprietary markup language format, parse the table information associated with the table to determine one or more markup language elements associated with the table, determine a plain text graphical table structured layout associated with the table, based on the one or more markup language elements, and generate a plain text graphical table structured view of the table indicating one or more data items indicated by the table information.

The details of one or more implementations are set forth in the accompanying drawings and the description below. Other features will be apparent from the description and drawings, and from the claims.

BRIEF DESCRIPTION OF THE DRAWINGS

FIG. 3 depicts an example markup language representation of a table.

FIG. 4 depicts another example markup language representation of the table represented by FIG. 3.

FIG. 5 depicts a processed structured representation of the table represented by FIG. 3 after parsing according to an example embodiment.

DETAILED DESCRIPTION

Figure 1:
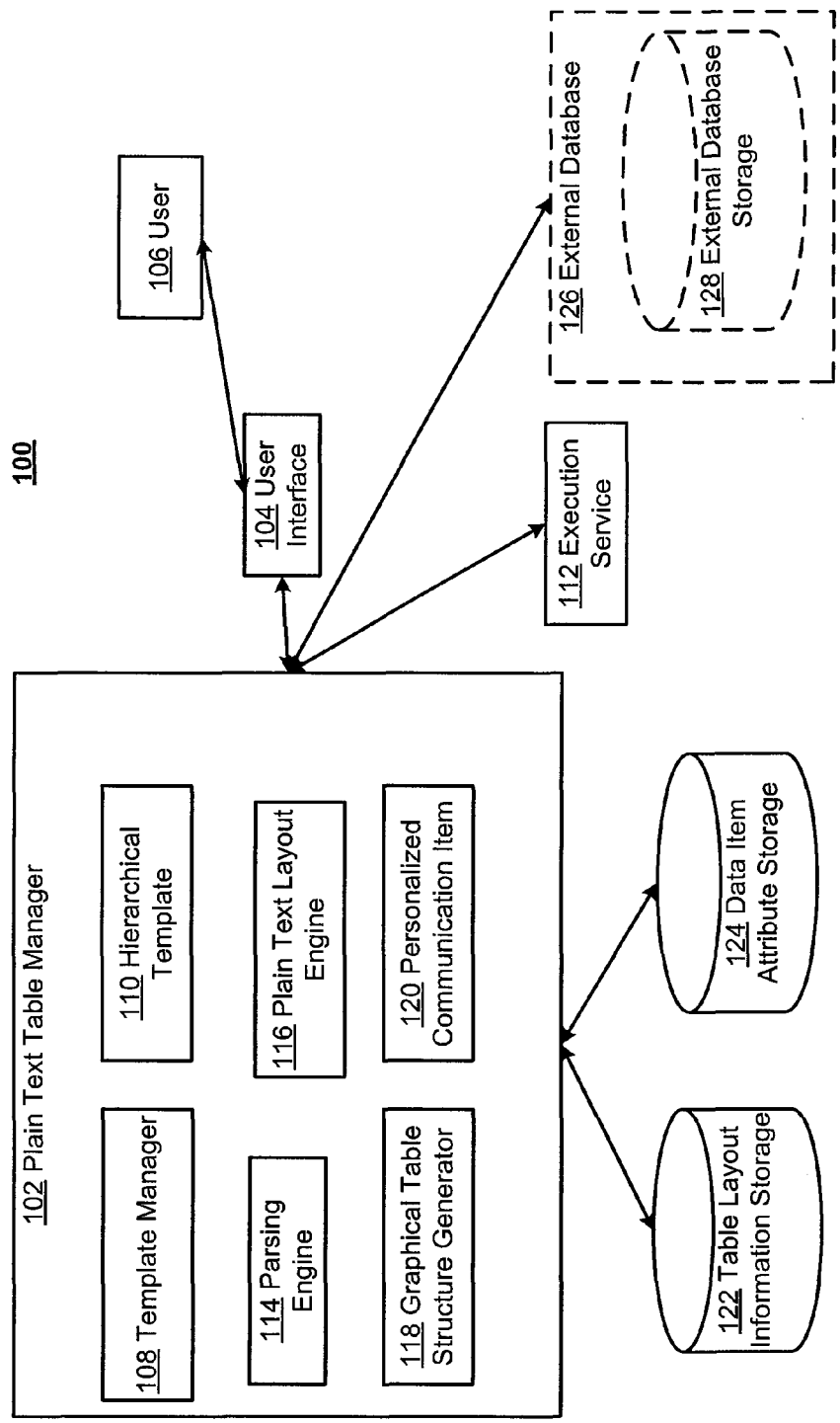
FIG. 1 is a block diagram of an example system for personalizing communication items.

FIG. 1 is a block diagram of a system 100 for plain text formatting of data item tables according to an example embodiment. In the example of FIG. 1, a plain text table manager 102 includes various processing engines that may be configured to manage personalized data item tables. According to an example embodiment, the system 100 may include a user interface 104 configured to manage communication with a user 106.

According to an example embodiment, the plain text table manager 102 may include a template manager 108 configured to obtain a hierarchical template 110 including table information associated with a table, the table information formatted in accordance with a non-proprietary markup language format. For example, table information may include formatting attribute information such as fonts, font sizes, background colors, border attributes, etc. For example, the table information may be obtained from a user entering the layout information via a user interface.

According to an example embodiment, the table information may include information formatted in accordance with a HyperText Markup Language (HTML) format. According to an example embodiment, the table information may include information formatted in accordance with an eXtensible Markup Language (XML) format.

According to an example embodiment, the template manager 108 may be configured to obtain the hierarchical template based on obtaining a hierarchical template including execution service information associated with an execution service 112 associated with personalized communication items, and table information associated with a table, the table information formatted in accordance with a non-proprietary markup language format.

According to an example embodiment, the hierarchical template 110 may include table information associated with a personalized data item table, the table information formatted in accordance with a non-proprietary markup language format.

According to an example embodiment, the plain text table manager 102 may include a parsing engine 114 configured to parse the table information associated with the table to determine one or more markup language elements associated with the table. For example, the table information may include HTML or XML elements associated with tables as discussed further below.

According to an example embodiment, the parsing engine 114 may be associated with the execution service 112.

According to an example embodiment, the markup language elements may include one or more of: a table element, a table definition element, a table header element, a table footer element, a table body element, a table column element, a table column group element, a table row element, a table data element, or a caption element.

According to an example embodiment, the plain text table manager 102 may include a plain text layout engine 116 configured to determine a plain text graphical table structured layout associated with the table, based on the one or more markup language elements. For example, the plain text graphical table structured layout may include table rows represented on different lines, with graphical delimiters separating row elements and column element values.

According to an example embodiment, the plain text table manager 102 may include a graphical table structure generator 118 configured to generate a plain text graphical table structured view of the table indicating one or more data items indicated by the table information.

According to an example embodiment, the graphical table structure generator 118 may be configured to generate a communication item view associated with the personalized data item table, the communication item view including a graphical representation of values of one or more data items associated with the data item attribute information displayed in accordance with the table layout information based on retrieving and processing the values, the table layout information, and the data item attribute information. For example, a communication item view may include actual product data substituted in for attribute values, in accordance with the table layout information. For example, the communication item view may be generated at execution time for sending a product table to a customer or potential customer.

According to an example embodiment, if a product table is included in a template or mail form, and if products are assigned to a campaign, up-to-date data associated with the products may be sent as product tables in table form in personalized communication items.

According to an example embodiment, the execution service 112 may be associated with personalized communication items, the execution service 112 configured to generate a communication item view including the plain text graphical table structured view of the table including the one or more data items indicated by the table information, the plain text graphical table structured view including one or more data item delimiter plain text characters, and to send a personalized communication item 120 including the communication item view to a target recipient.

According to an example embodiment, the one or more data item delimiter plain text characters may include one or more of: a "|" delimiter indicating a separation of data items associated with adjacent columns of the table or indicating a vertical border of the table, a "/" delimiter indicating a separation of data items associated with adjacent columns of the table or indicating a vertical border of the table, a "\" delimiter indicating a separation of data items associated with adjacent columns of the table or indicating a vertical border of the table, a "*" delimiter indicating a separation of data items associated with the table or indicating a border of the table, a "-" delimiter indicating a separation of data items associated with adjacent rows of the table or indicating a horizontal border of the table, or a "_" delimiter indicating a separation of data items associated with adjacent rows of the table or indicating a horizontal border of the table.

According to an example embodiment, a personalized communication item including the communication item view may be sent to one or more target recipients. For example, an email may be generated, including a product table formatted in accordance with the table layout information, with values filled in, in accordance with data item attribute information.

According to an example embodiment, the plain text table manager 102 may further include the hierarchical template 110 including a description of the execution service 112 associated with the personalized communication item 120 based on the template information, wherein the execution service 112 may be configured to provide the personalized communication item 120 to a target recipient based on the hierarchical template 110.

According to an example embodiment, the table layout information may be stored in a table layout information storage area 122. According to an example embodiment, the data item attribute information may be stored in a data item attribute storage area 124.

According to an example embodiment, the personalized communication item 120 may include one or more of an email message, a facsimile message, a letter, a personalized web page, or an electronic text message. The personalized communication item 120 may be sent as a plain text communication item based on preferences of a sender or a receiver. For example, a recipient may prefer to receive only plain text communications to save on storage or transmission overhead. One skilled in the art of data processing will appreciate that many other forms of personalized communication may also be used without departing from the spirit of the present discussion.

According to an example embodiment, an external database 126 may include an external database storage area 128 for storing database information external to the plain text table manager 102. For example, the user 106 may wish to generate personalized communication items 120 based at least in part on information stored in the external database 126.

According to an example embodiment, a user such as a business may generate a personalized contact with its customers as part of marketing campaigns. For example, the personalized contact may include individual product offerings, or may be realized via an appropriate choice of a correspondence language, salutation, first name, name, address, or other personalized features. Such a personalized approach may contribute significantly, for example, to an increase in customer loyalty from a business perspective.

According to an example embodiment, personalizable templates of marketing documents may be designed for many different types of contact channels, for example, an email message, a facsimile message, a letter, a personalized web page, a Short Message Service (SMS) message, a message included in a file export, or an electronic text message.

According to an example embodiment, the system 100 may provide personalized tables for inclusion in personalized mails associated with marketing by a user.

According to an example embodiment, a table parsed by the parsing engine 114 may be provided by any type of provider of information for inclusion in the hierarchical template 110.

Figure 2:
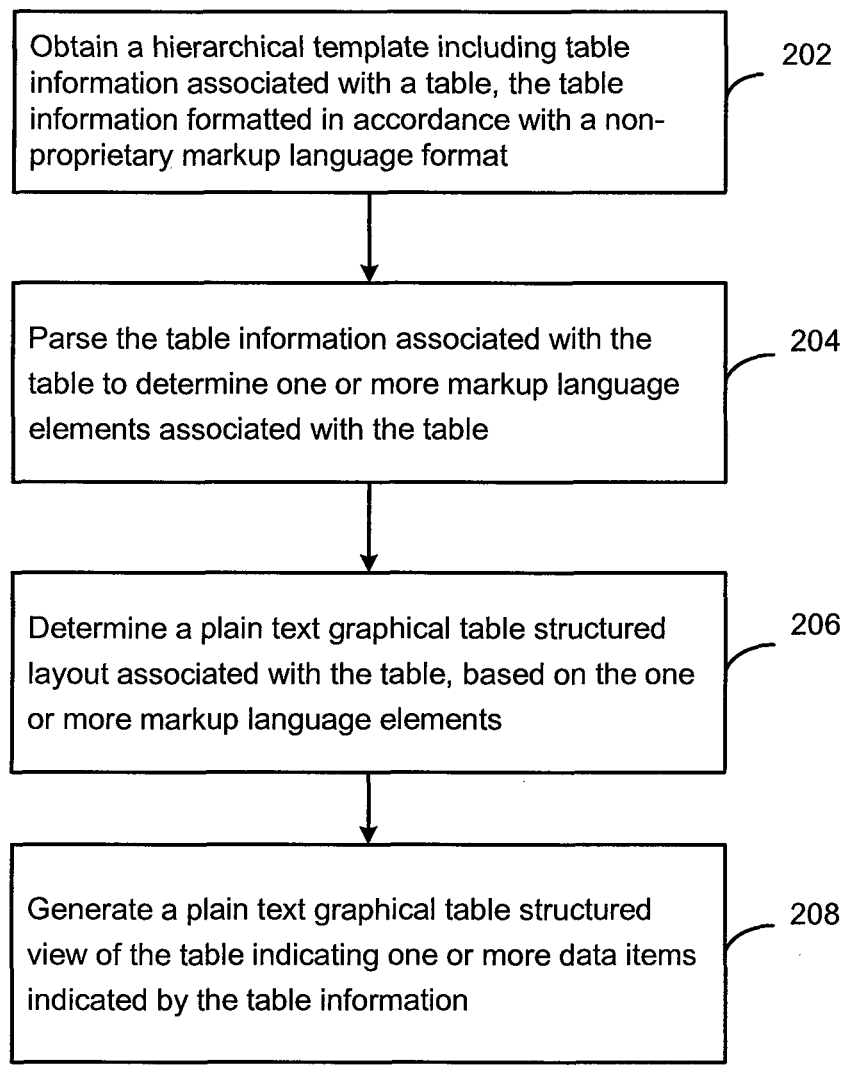
FIG. 2 is a flowchart illustrating an operation of the system of FIG. 1 according to an example embodiment.

FIG. 2 is a flowchart 200 illustrating an operation of the system of FIG. 1. According to an example embodiment, a method may include a hierarchical template including table information associated with a table, the table information formatted in accordance with a non-proprietary markup language format (202). For example, the template manager 108 may obtain the hierarchical template including table information associated with a personalized data item table as discussed previously.

According to an example embodiment, the hierarchical template may include execution service information associated with an execution service associated with personalized communication items, and table information associated with the table, the table information formatted in accordance with the non-proprietary markup language format. For example, the table information may include information formatted in accordance with one or more of a HyperText Markup Language (HTML) format or an eXtensible Markup Language (XML) format.

According to an example embodiment, the method may further include parsing the table information associated with the table to determine one or more markup language elements associated with the table (204). For example, the parsing engine 114 may parse the table information associated with the table to determine one or more markup language elements associated with the table, as discussed previously.

According to an example embodiment, a parsing engine associated with the execution service 112 may parse the table information associated with the table to determine the one or more markup language elements associated with the table.

According to an example embodiment, the markup language elements may include one or more of: a table element, a table definition element, a table header element, a table footer element, a table body element, a table column element, a table column group element, a table row element, a table data element, or a caption element.

According to an example embodiment, the method may further include determining a plain text graphical table structured layout associated with the table, based on the one or more markup language elements (206). For example, the plain text layout engine 116 may determine a plain text graphical table structured layout associated with the table, as discussed previously.

According to an example embodiment, the method may further include generating a plain text graphical table structured view of the table indicating one or more data items indicated by the table information (208). For example, the graphical table structure generator 118 may generate a plain text graphical table structured view of the table, as discussed previously.

According to an example embodiment, the method may further include generating, by an execution service associated with personalized communication items, a communication item view including the plain text graphical table structured view of the table indicating the one or more data items indicated by the table information, the plain text graphical table structured view including one or more data item delimiter plain text characters; and sending a personalized communication item including the communication item view to a target recipient. For example, the execution service 112 may generate the communication item view including the plain text graphical table structured view of the table, as discussed previously.

According to an example embodiment, the personalized communication item 120 may include one or more of an email message, a facsimile message, a letter, a personalized web page, a Short Message Service (SMS) message, a message included in a file export, or an electronic text message.

FIG. 3 depicts an example markup language representation 300 of a table. The example table representation 300 may have been generated by a user via a user interface, or may have been generated by a table generator, for example, configured to generate tables which may be personalized for transmission to target recipients via a personalized data communication item. The example table representation 300 is shown in HTML format, corresponding to an XML format as shown in FIG. 4.

As shown in the example of FIG. 4, the table representation 400 includes a table element 402 that includes table elements align 404, style 406, and summary 408. In general, table elements may indicate table structuring (e.g., table, row, column), and table attributes may indicate formatting indicators (e.g., font, color, alignment). The table representation 400 further includes a table head element 410 that may include information associated with the table columns. As shown in FIG. 4, the table head element 410 includes a tr element 412 indicating a row of table cells. A style attribute 414 may indicate a formatting of the row of table cells. The tr element 412 may include a th element 416 indicating a table header cell, a text string 418 for inclusion in the table header cell, a th element 420, and a text string 422. For example, a table associated with the table representation 400 may include a table head including a row including two header cells having text strings "Product ID" and "Description" respectively.

The table representation 400 further includes a table body element 424 that may include information associated with the table columns included in the table body. The table body element 424 may include a tr attribute 426 including a style attribute 428 indicating a formatting of a row of table cells included in the table body. A td element 430 indicating a table data cell may include text data 432, and a td element 434 indicating a table data cell may include text data 436. Thus, in accordance with the example table representation 400, the table may include a table body including a row of two table cells having data including text strings "DIRKS_PRODUCT" and "Product of Dirk" respectively.

FIG. 5 depicts a processed structured representation 500 of the table represented by FIG. 3 after parsing according to an example embodiment. For example, the parsing engine 114 may parse the HTML code of FIG. 3 to determine the markup language elements 402, 410, 412, 416, 420, 424, 426, 430, 434, the attributes 404, 406, 408, 414, 428, and the text strings

418, 422, 432, and 436. For example, the plain text layout engine 116 discussed previously may determine a plain text graphical table structured layout associated with the table, based on the one or more markup language elements.

Figure 6:
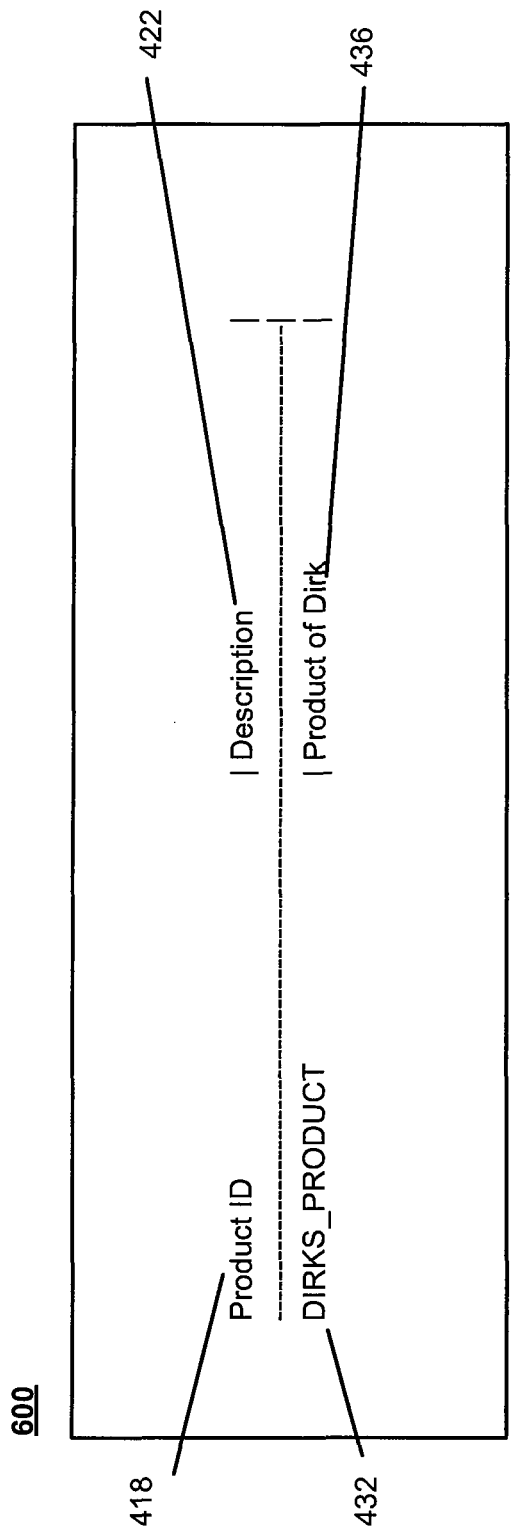
FIG. 6 depicts a plain text graphical table structured view of the table represented by FIG. 3 according to an example embodiment.

FIG. 6 depicts a plain text graphical table structured view 600 of the table represented by FIG. 3 according to an example embodiment. For example, the graphical table structure generator 118 may generate the plain text graphical table structured view of the table indicating one or more data items indicated by the table information. As shown in the example of FIG. 6, values in cells may be shown with delimiters to separate rows and columns. For example, a "|" delimiter may indicate a vertical separation of data values included in row cells, and a "-" or "_" delimiter may indicate a horizontal separation of data values included in column cells. As shown in FIG. 6, rows may be indicated on separate lines of a view, and spacing may be determined such that values in columns are shown as cells having substantially the same width, and lined up as a column when viewed in a vertical sense. One skilled in the art of data processing will appreciate that many other delimiters may be used to separate the parts of the table, and other types of output may be used to indicate a plain text table. For example, this type of plain text table may be used for any type of text communication, including mail, fax, SMS or email.

Figure 7:
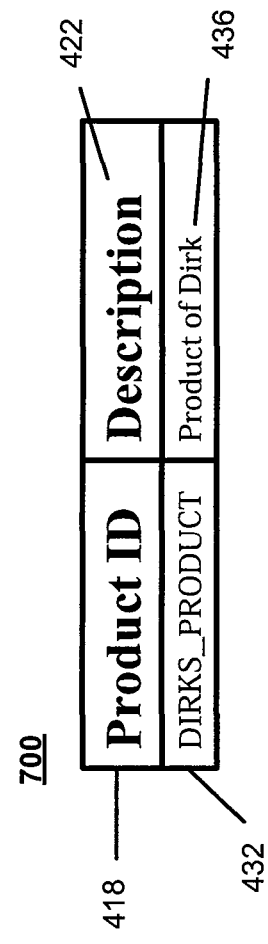
FIG. 7 depicts a formatted structured table view of the table represented by FIG. 3 in accordance with the markup language representation according to an example embodiment.

FIG. 7 depicts a formatted structured table view 700 of the table represented by FIG. 3 in accordance with the markup language representation according to an example embodiment. For example, although not shown, the formatted structured table view 700 may include background color, font color, various types of fonts, and any other type of formatting provided by markup language representations.

Figure 8:
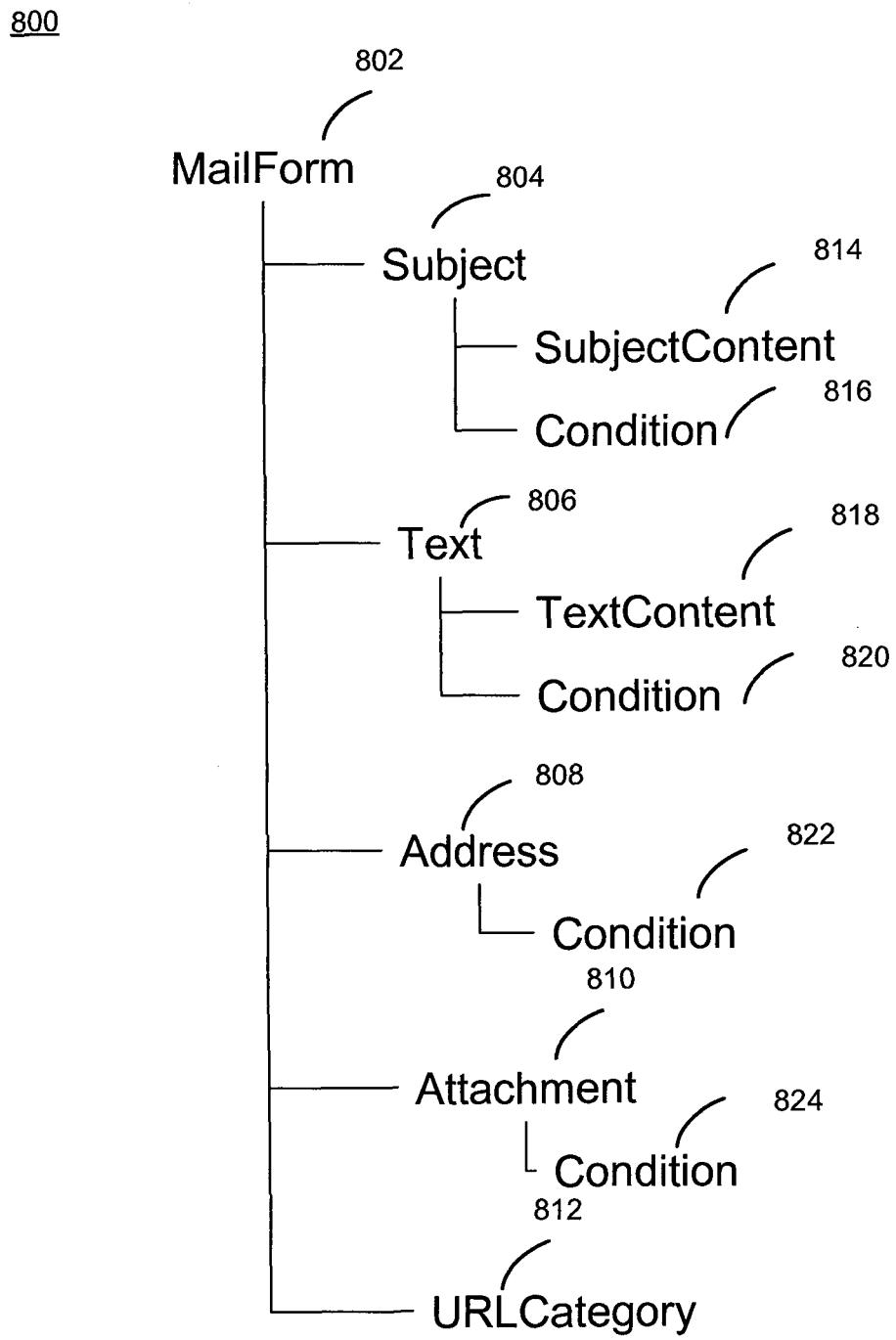
FIG. 8 is a diagram of an example structure of a hierarchical template for personalizing communication items according to an example embodiment.

FIG. 8 illustrates a hierarchical template structure 800 according to an example embodiment. In the example of FIG. 8, a Mailform 802 template structure includes example elements Subject 804, Text 806, Address 808, Attachment 810, and URLCategory 812. Each of the elements on a first level may include hierarchical sub-levels. For example, the element Subject 804 may include sub-levels SubjectContent 814 and Condition 816.

As other examples, the element Text 806 may include sub-levels TextContent 818 and Condition 820, the element Address 808 may include sub-level Condition 822, and the element Attachment 810 may include sub-level Condition 824.

Figure 9:
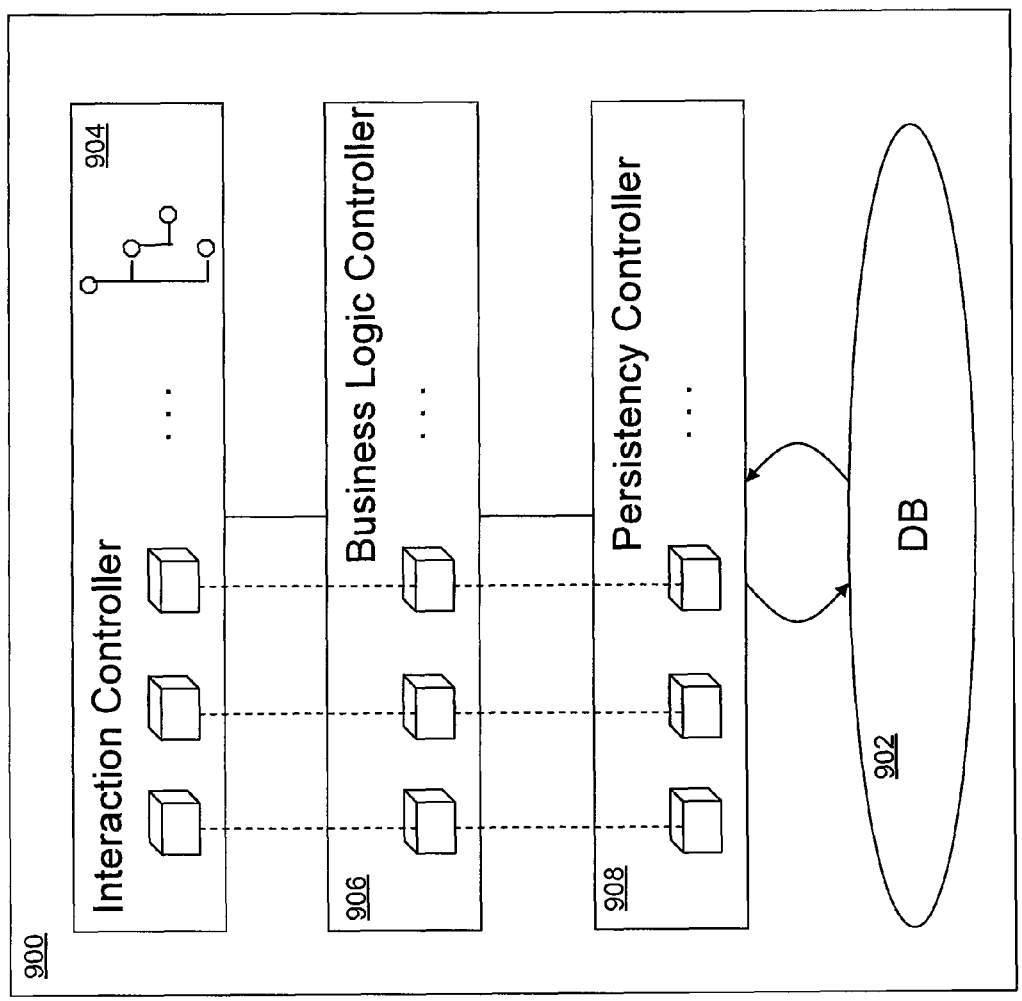
FIG. 9 is a block diagram of a system for personalizing communication items according to an example embodiment.

FIG. 9 is a block diagram of a system 900 for personalizing communication items according to an example embodiment. In the example of FIG. 9, a database layer 902 may be configured to store template information associated with a personalized communication item 120 and a hierarchical template 110 including a description of an execution service 112 associated with the personalized communication item 120 based on the template information, wherein the execution service 112 may be configured to provide the personalized communication item 120 to a target recipient based on the template; an interaction controller 904 including one or more application programming interfaces and a user interface configured to receive user input associated with the template and template information; a business logic controller 906 configured to obtain the template information via the interaction controller 904; and a persistency controller 908 configured to store and retrieve information associated with the database layer 902.

According to an example embodiment, the interaction controller 904 may be configured to receive requests for updating the template and template information. For example, the interaction controller 904 may receive requests from a user such as the user 106 discussed previously.

According to an example embodiment, the interaction controller 904 may be configured to receive requests for one or more of creating, reading, updating, or deleting information elements associated with the template.

According to an example embodiment, the persistency controller 908 may be configured to store and retrieve information associated with the database layer 902 in binary format. Thus, for example, users on different platforms may retrieve the information and view a display of the information via a format associated with the platform in use by the user.

According to an example embodiment, personalized communication items may also be executed by external agencies, for example, as a part of direct marketing activity during which a certain target group is to be personally contacted via mail, fax, SMS or email. For example, the external agencies may receive data files with the extracted customer data and may send out personalized communication items based on this data. As another example, the external agencies may contact members of the target group via calls or personal visits based on the extracted data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method comprising:
   presenting, to a user, a user interface for entering table layout information;
   receiving, from the user via the user interface, a hierarchical template including table layout information associated with a table, the table layout information formatted in accordance with a non-proprietary markup language format, the table information received from the user including markup language elements, attributes including style attributes, and data items including text strings associated with the table;
   parsing the table layout information received from the user associated with the table to determine the markup language elements, the attributes including the style attributes, and the data items including the text strings associated with the table;
   storing the data items including the text strings associated with the table;
   determining a plain text graphical table structured layout associated with the table, the plain text graphical structured layout including a listing of the markup language elements;
   storing the text strings as non-marked up text;
   generating a plain text graphical table of the table with the text strings stored as non-marked up text; and
   generating a plain text graphical table structured view of the table, the generating including substituting the data items including the text strings stored as non-marked up text for the attribute values in accordance with the table layout information.

2. The method of claim 1 wherein:
   receiving the hierarchical template includes receiving the hierarchical template including execution service information associated with an execution service associated with personalized communication items which include the plain text graphical structured view, and the table layout information associated with the table, the table layout information formatted in accordance with the non-proprietary markup language format, and
   parsing the table layout information includes parsing, by a parsing engine associated with the execution service, the table layout information associated with the table to determine the one or more markup language elements associated with the table.

3. The method of claim 1 wherein:
   receiving the hierarchical template includes obtaining the hierarchical template including table layout information associated with the table, the table layout information formatted in accordance with a HyperText Markup Language (HTML) format.

4. The method of claim 1 wherein:
   receiving the hierarchical template includes obtaining the hierarchical template including table layout information associated with the table, the table layout information formatted in accordance with an eXtensible Markup Language (XML) format.

5. The method of claim 1 wherein:
   receiving the hierarchical template includes obtaining the hierarchical template including table layout information associated with a personalized data item table, the table layout information formatted in accordance with the non-proprietary markup language format.

6. The method of claim 1 wherein:
   parsing the table layout information includes parsing the table layout information associated with the table to determine one or more markup language elements associated with the table, the markup language elements including one or more of:
   a table element,
   a table definition element,
   a table header element,
   a table footer element,
   a table body element,
   a table column element,
   a table column group element,
   a table row element,
   a table data element, or
   a caption element.

7. The method of claim 1 and further comprising:
   generating, by an execution service associated with personalized communication items, a communication item view including the plain text graphical table structured view of the table indicating the one or more data items substituted for the attribute values, the plain text graphical table structured view including one or more data item delimiter plain text characters; and
   sending a personalized communication item including the communication item view to a target recipient after generating the plain text graphical table structured view of the table.

8. The method of claim 1, further comprising:
   storing the table layout information associated with the table including the markup language elements, the attributes including the style attributes, and the data items including the text strings associated with the table.

9. The method of claim 1, wherein:
   the markup language elements include one or more of a table element, a table definition element, a table header element, a table footer element, a table body element, a table column element, a table column group element, a table row element, a table data element, and a caption element.

10. The method of claim 1, wherein the non-marked up text includes non-marked up plain text.

11. A system comprising:
at least one processor; and
at least one memory device comprising code stored thereon that, when executed by the at least one processor, is configured to cause the system to implement a plain text table manager including:
a template manager configured to:
present, to a user, a user interface for entering table layout information; and
receive, from the user via the user interface, a hierarchical template including table layout information associated with a table, the table layout information formatted in accordance with a non-proprietary markup language format, the table information received from the user including markup language elements identifying table cells of the table, attributes including style attributes for the table cells of the table, and data items including text strings associated with the values of the table cells of the table;
a parsing engine configured to parse the table layout information received from the user associated with the table to determine the markup language elements identifying the table cells of the table, the attributes including the style attributes for the table cells of the table, and the data items including the text strings associated with the values of the table cells of the table;
a plain text layout engine configured to determine a plain text graphical table structured layout associated with the table, the plain text graphical structured layout including a listing of the markup language elements identifying the table cells of the table, the attributes including the style attributes for the table cells of the table, and the data items including the text strings associated with the values of the table cells of the table; and
a graphical table structure generator configured to generate a plain text graphical table structured view of the table with the text strings as non-marked up text, the plain text graphical table structured view including the text strings associated with the values of the table cells of the table formatted in one or more rows and columns in accordance with the table layout information.

12. The system of claim 11 wherein:
the template manager is configured to obtain the hierarchical template based on obtaining a hierarchical template including execution service information associated with an execution service associated with personalized communication items which include the plain text graphical structured view, and the table layout information associated with the table, the table information formatted in accordance with the non-proprietary markup language format, and
the parsing engine is associated with the execution service.

13. The system of claim 11 wherein:
the template manager is configured to obtain the hierarchical template based on obtaining a hierarchical template including table layout information associated with the table, the table layout information formatted in accordance with a HyperText Markup Language (HTML) format.

14. The system of claim 11 wherein:
the template manager is configured to obtain the hierarchical template based on obtaining a hierarchical template including table layout information associated with the table, the table layout information formatted in accordance with an eXtensible Markup Language (XML) format.

15. The system of claim 11 wherein:
the template manager is configured to obtain the hierarchical template based on obtaining the hierarchical template including table layout information associated with a personalized data item table, the table layout information formatted in accordance with a non-proprietary markup language format.

16. The system of claim 11 wherein:
the parsing engine is configured to parse the table layout information based on parsing the table layout information associated with the table to determine one or more markup language elements associated with the table, the markup language elements including one or more of:
a table element,
a table definition element,
a table header element,
a table footer element,
a table body element,
a table column element,
a table column group element,
a table row element,
a table data element, or
a caption element.

17. The system of claim 11, further comprising:
an execution service associated with personalized communication items, the execution service configured to generate a communication item view including the plain text graphical table structured view of the table including the one or more data items substituted for the attribute values, the plain text graphical table structured view including one or more data item delimiter plain text characters, and to send a personalized communication item including the communication item view to a target recipient after the graphical table structure generator has generated the plain text graphical table structured view of the table.

18. The system of claim 17 wherein the one or more data item delimiter plain text characters include one or more of:
a "|" delimiter indicating a separation of data items associated with adjacent columns of the table or indicating a vertical border of the table,
a "/" delimiter indicating a separation of data items associated with adjacent columns of the table or indicating a vertical border of the table,
a "\" delimiter indicating a separation of data items associated with adjacent columns of the table or indicating a vertical border of the table,
a "*" delimiter indicating a separation of data items associated with the table or indicating a border of the table,
a "-" delimiter indicating a separation of data items associated with adjacent rows of the table or indicating a horizontal border of the table, or
a "_" delimiter indicating a separation of data items associated with adjacent rows of the table or indicating a horizontal border of the table.

19. The system of claim 11, wherein:
the plain text table manager is configured to store the table layout information associated with the table including the markup language elements, the attributes including the style attributes, and the data items including the text strings associated with the table.

20. The system of claim 11, wherein:
the markup language elements include one or more of a table element, a table definition element, a table header element, a table footer element, a table body element, a table column element, a table column group element, a table row element, a table data element, and a caption element.

21. The system of claim 11 wherein:
the graphical table structure generator is further configured to generate a communication item view of the table in a plain text-based communication medium including a plain text email message with the text strings as non-marked up text.

22. The system of claim 11 wherein:
the non-proprietary markup language format includes HyperText Markup Language (HTML) code,
the table layout information associated with the table received from the user via the user interface is formatted in accordance with the non-proprietary markup language format including HTML code,
the HTML coded table information associated with the table is displayable in a browser including a Web browser, and
the graphical table structure generator is further configured to generate a communication item view of the table in a plain text-based communication medium including a plain text email message with the text strings as non-marked up text, the plain text generated table being displayable as non-marked up text in the plain text email message in accordance with the arrangement of the table formatted with the HTML coded table information.

23. The system of claim 11 wherein:
the non-proprietary markup language format includes eXtensible Markup Language (XML) code,
the table layout information received from the user via the user interface is formatted in accordance with the non-proprietary markup language format including XML code,
the XML coded table information received from the user via the user interface is displayable in a browser including a Web browser, and
the graphical table structure generator is further configured to generate a communication item view of the table in a plain text-based communication medium including a plain text email message with the text strings as non-marked up text, the plain text generated table being displayable as non-marked up text in the plain text email message in accordance with the arrangement of the table formatted with the XML coded table information.

24. The system of claim 11, wherein the non-marked up text includes non-marked up plain text.

25. A non-transitory computer-readable storage medium comprising computer-readable code stored thereon that, when executed, is configured to cause a data processing apparatus to:
present, to a user, a user interface for entering table layout information;
receive, from the user via the user interface, a hierarchical template including table layout information associated with a table, the table layout information formatted in accordance with a non-proprietary markup language format, the table information received from the user including markup language elements, attributes including style attributes, and data items including text strings associated with the table;
store the data items including the text strings associated with the table;
determine a plain text graphical table structured layout associated with the table, the plain text graphical structured layout including a listing of the markup language elements;
store the text strings as non-marked up text;
generate a plain text graphical table of the table with the text strings stored as non-marked up text; and
generate a plain text graphical table structured view of the table indicating one or more data items, the generating including substituting the data items including the text strings stored as non-marked up text for the attribute values in accordance with the table layout information.

26. The non-transitory computer-readable medium of claim 25, further configured to cause the data processing apparatus to:
receive the hierarchical template based on receiving a hierarchical template including execution service information associated with an execution service associated with personalized communication items which include the plain text graphical structured view, and table layout information associated with the table, the table layout information formatted in accordance with a non-proprietary markup language format, and
parse the table layout information based on parsing, by a parsing engine associated with the execution service, the table layout information associated with the table to determine one or more markup language elements associated with the table.

27. The non-transitory computer-readable medium of claim 25, further configured to cause the data processing apparatus to:
obtain the hierarchical template based on obtaining a hierarchical template including table layout information associated with the table, the table layout information formatted in accordance with a HyperText Markup Language (HTML) format.

28. The non-transitory computer-readable medium of claim 25, further configured to cause the data processing apparatus to:
parse the table layout information based on parsing the table information associated with the table to determine one or more markup language elements associated with the table, the markup language elements including one or more of:
a table element,
a table definition element,
a table header element,
a table footer element,
a table body element,
a table column element,
a table column group element,
a table row element,
a table data element, or
a caption element.

29. The non-transitory computer-readable medium of claim 25, further configured to cause the data processing apparatus to:
generate, by an execution service associated with personalized communication items, a communication item view including the plain text graphical table structured view of the table indicating the one or more data items substituted for the attribute values, the plain text graphical table structured view including one or more data item delimiter plain text characters; and send a personalized communication item including the communication item view to a target recipient after generating the plain text graphical table structured view of the table.

30. The non-transitory computer-readable medium of claim 25, further configured to cause the data processing apparatus to:
store the table layout information associated with the table including the markup language elements, the attributes including the style attributes, and the data items including the text strings associated with the table.

31. The non-transitory computer-readable medium of claim 25, wherein:
the markup language elements include one or more of a table element, a table definition element, a table header element, a table footer element, a table body element, a table column element, a table column group element, a table row element, a table data element, and a caption element.

32. The non-transitory computer-readable storage medium of claim 25, wherein the non-marked up text includes non-marked up plain text.

\* \* \* \* \*